July 3, 1923.  
D. F. COMSTOCK  
1,460,706  
PRODUCTION OF COMPLEMENTAL IMAGES  
Filed Oct. 6, 1920
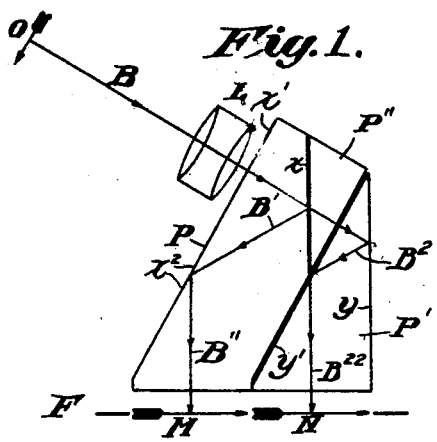
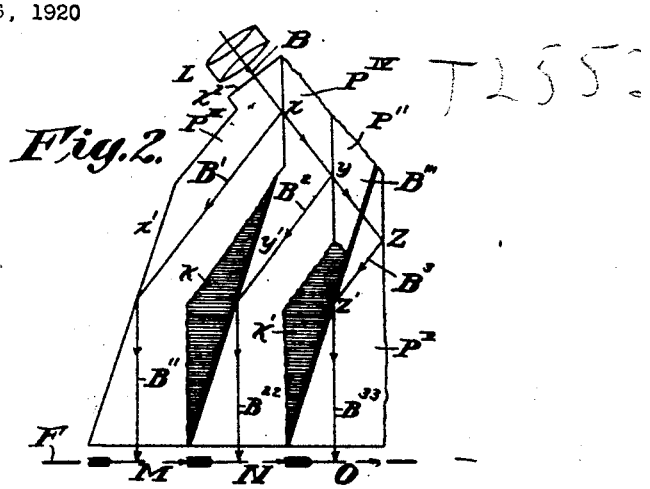
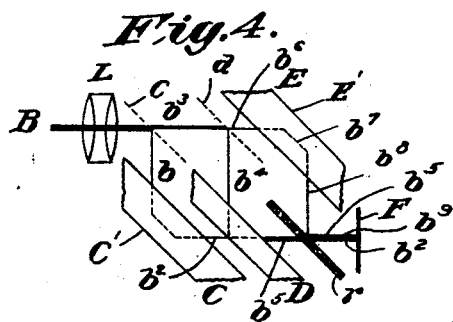
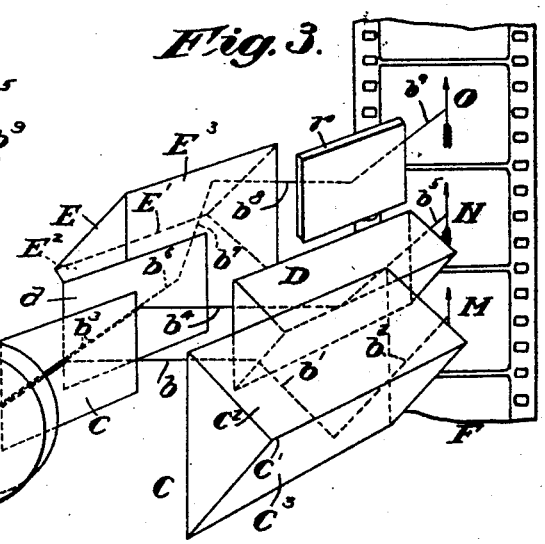
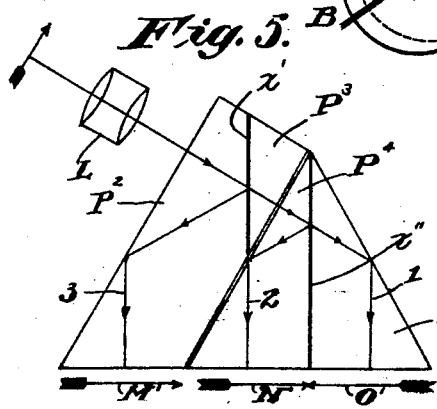
Inventor  
Daniel F. Comstock  
by Roberts, Roberts & Cushman  
his Attorney Patented July 3, 1923.

1,460,706

UNITED STATES PATENT OFFICE.

DANIEL F. COMSTOCK, OF CAMBRIDGE, MASSACHUSETTS, ASSIGNOR TO KALMUS, COMSTOCK & WESCOTT, INC., OF BOSTON, MASSACHUSETTS, A CORPORATION OF MASSACHUSETTS.

PRODUCTION OF COMPLEMENTAL IMAGES.

Application filed October 6, 1920. Serial No. 415,073.

*To all whom it may concern:*

Be it known that I, DANIEL F. COMSTOCK, citizen of the United States of America, and resident of Cambridge, in the county of Middlesex and State of Massachusetts, have invented new and useful Improvements in the Production of Complemental Images, of which the following is a specification.

The principal object of the present invention is to secure complemental images which are geometrically identical so that they may be accurately registered or superposed according to either "additive" or "subtractive" methods. Other objects are to secure such images in juxtaposed relationship on the same side of the film, to reduce the distance between the objective and the image plane, and generally to improve the art of forming complemental images.

The problem admits of solution along several distinct lines, according as one or more lenses are used in the camera, and according as the simultaneous photographs on the film are similarly arranged, or are symmetrical with relation to a common axis but inverted or reversed with relation to each other. In the present application which is in part a continuation of my former application Serial No. 77,237, filed February 9, 1916, I claim means particularly intended to form the complemental images in similar arrangement, e. g. with the heads of the images all directed in the same direction, although the subject-matter herein claimed may be employed to form certain of the images in reversed relationship to other of the images.

In the accompanying drawings, Figs. 1 to 5 inclusive illustrate diagrammatically several optical systems for obtaining a plurality of images of the same scene from accurately the same point of view at the same time.

Referring to Fig. 1, O represents the object field (the scene to be photographed), L represents the lens, and F represents the film. The light beam B from the object passes through the lens and the glass prism P, perpendicular to surface $x^1$ of prism P, to the semi-transparent reflecting surface $x$, which may be made by half-silvering the surface of prism P, or by introducing between P and P" a film of some transparent substance of suitable refractive index, or which may be a light-dividing "grid" of transparent material having distributed thereon distinct areas of transmission and of reflection made according to my Patent No. 1,231,710, granted July 3, 1917. A part of the light (ordinarily about one-half the light in two-color work) is reflected from surface $x$ along the path B' to the totally reflecting surface $x^2$, and thence along path B" to the film, forming an image on the film F at M. The remainder of the light passes through surface $x$ and through prisms P" and P' to the totally reflecting surface $y$, parallel to $x$, of the prism P', and is thence reflected along the path $B^2$ to the totally reflecting surface $y'$, parallel to $x^2$, of prisms P', and thence along path $B^{22}$ to the film, and forms a second image on the film F at N. Prism P' is separated from prisms P and P" by a thin film of air or other substance of sufficiently low refractive index to insure total reflection from surface $y'$. This system gives images similarly arranged, that is, head to foot, since each beam is reflected twice. By the inclusion of prism P" the geometrical lengths of the two paths of the divided beam in the same or similar media are the same.

Fig. 2 shows the same principle applied to the formation of three simultaneous pictures similarly arranged (head to foot), and scarcely needs additional explanation. The beam B enters prism P''' through surface $x^2$, which is normal to the beam. Partly transparent reflecting surface $x$ reflects essentially one-third of the light along path B', to the totally reflecting surface $x'$ and thence along path B" to the film F, forming an image at M. The remainder of the light passes through prism $P^{iv}$ to semi-transparent reflecting surface $y$, where the beam is again split, substantially half being reflected along path $B^2$ to the totally reflecting surface $y'$ and thence along path $B^{22}$ to form the image N on the film, while the remainder of the beam passes through prism P", (which furnishes a medium of glass) and prism $P^v$ to totally reflecting surface $z$, thence along path $B^3$ to totally reflecting surface $z'$, and thence to the film forming an image at O. The surfaces $x'$, $y'$ and $z'$ are totally reflecting surfaces, the latter two being rendered so by films of air between said surfaces and the adjacent prisms, or by applying to the surfaces $y'$ and $z'$ of prisms $P^{iv}$ and $P^v$ some medium of suitable refractive index such as ordinary balsam which has a sufficiently low index of refraction to yield total reflection, as in the case of air, and also affords protection against the soiling of the glass surfaces. The prisms $P'''$ and $P^{iv}$ are hollowed out opposite surfaces $y'$ and $z'$, and are coated with black balsam as shown at $k$, $k'$, or other suitable material, to prevent any stray light from passing between the prisms $P'''$ and $P^{iv}$, or between the prisms $P^{iv}$ and $P^v$. For $z'$ in particular it is desirable to use a film of only slightly lower index than the glass, which, without interfering with the total reflection of ray $B^3$, will diminish the loss by reflection of part of the intitial beam B when entering the prism $P^v$.

Figs. 3 and 4 show perspective and plan views, respectively, of another arrangement of prisms for producing a result similar to that of the system shown in Fig. 2, namely, the formation on the same film of three pictures simultaneously from accurately the same point of view, at equal optical distances from the lens. This arrangement involves a longer optical path than that of Fig. 2, one advantage over the latter being that it involves no angles other than 90° and 45° angles, thus requiring only standard shapes of prisms.

Both Figs. 3 and 4 are diagrammatic or schematic and the oblique view of the system, shown in Fig. 3 as an aid to visualization, is a view from an angle of approximately 45° to the plane of Fig. 4, from the lower left-hand corner, and in both figures no account is taken of the refraction of light due to entering and leaving the prisms at angles other than right angles; in other words for the sake of clearness and to avoid complication in drawing, the diagrams show the paths of the beams as though the prisms were leaves-of-a-book mirrors. The beam B is to be divided into three parts, and for clearness is shown in three lines. From the lens L the beam falls upon the partly transparent reflecting surface $c$, which may be any suitable form of light-dividing means such as a partly silvered surface, or a light-dividing grid, adapted to transmit substantially two-thirds of the light and to reflect substantially one-third of the light, said surface $c$ being arranged at an angle of 45° to the path of the beam. The reflected part of the beam passes along path $b$ to the totally reflecting right-angle prism C, whose apex $C'$ is in a plane below and parallel to the horizontal plane of the light beam, and in a vertical plane at an angle of 45° to the split beam $b$. The beam $b$ strikes the upper face $C^2$ of the prism and is reflected downward along path $b'$ to the lower face $C^3$, and thence along path $b^2$ to the film F, forming an image at M. Said lower right-angle prism C thus shifts the beam sidewise with relation to the prism, that is, lengthwise of the film, and reverses the image.

The rest of the beam B passes along the path $b^3$ to semitransparent reflecting surface $d$, which is a suitable light-dividing means adapted to transmit substantially half of the light and to reflect substantially half of the light, said surface $d$ being arranged at an angle of 45° to the path of the beam. The reflected part of the beam, i. e. substantially half of the beam $b^3$, or one-third of the total beam B, passes along path $b^4$ to the totally reflecting right-angle prism D whose apex is in the same horizontal plane as the light beam $b^4$ and at an angle of 45° thereto. This prism D, being centrally located with respect to the horizontal plane of the beam, does not shift the beam but reverses the image and reflects the beam along path $b^5$ and forms an image on the film at N. A plane reflector would accomplish the same purpose as prism D, except that it would not reverse the image, which would then not be arranged similarly to the other two.

The part of the light transmitted by surface $d$, passes along path $b^6$ to the upper right-angle totally reflecting prism E, which is similar to prism C but oppositely arranged and has its apex $E'$ above the plane of the light beam. The beam $b^6$ strikes the lower face $E^2$, from which it is reflected along path $b^7$ to the upper face $E^3$. This shifts the beam sidewise with relation to the prism, that is, upward and lengthwise of the film, and reverses the image. From surface $E^3$ the beam passes along path $b^8$ to the totally reflecting surface $r$, which is at an angle of 45° to the beam, and thence along path $b^9$ to the film F, forming an image at O.

The three images are similarly arranged, or head-to-foot, since each split beam is once reversed by a right-angle prism, and once reflected. The entire apparatus may be made in the form of a solid block of glass, of which the prism-surfaces indicated form part of the bounding surface. The incidence is in all cases so oblique as to insure total reflection.

The optical system illustrated in Fig. 5 comprises an objective L and four prisms $P^2$, $P^3$, $P^4$ and $P^5$. The prisms $P^2$ and $P^3$ correspond to the prisms P and $P''$ of Fig. 1 and a light transmitting-reflecting device $x'$ corresponding to $x$ of Fig. 1 is placed therebetween. The prisms $P^4$ and $P^5$ together form an equilateral triangle in cross-section and a light transmitting-reflecting device $x''$ is placed therebetween, these two prisms together forming a unit which is described and claimed in my parent application above referred to. Owing to the fact that the component beam 1 is only once reflected, whereas the component beams 2 and 3 are each twice reflected, image O' is reversed with respect to images M' and N'.

A feature characteristic of the present invention is substantial equality between the two or more optical paths from lens to images, this being due to the fact that the lengths of the paths of the split beams in glass and in air are the same. This is highly advantageous as only in this way can the optical corrections for the glass be performed all at once by a single correcting device for the entire beam before the beam is split.

An important problem solved in each of the above devices is to obtain the desired arrangement of images and the necessary equality of paths, without excessive length of path from lens to images. This restriction results from rigid limitation imposed by practical considerations on the focal length of the lens used—a limitation which excludes many possible arrangements because of the too great length of path they require.

It follows that, unless metal reflectors are used (which in general is not feasible), in systems involving a single lens, a large part of the path from lens to images must lie within the glass prisms used to divide and manipulate the light.

This mass of glass acts as a lens and unless the prisms are coordinated with the objective so that the optical system as a whole is optically correct, aberrations (curvature of field, chromatic aberrations, and spherical aberrations) will result. Such a coordinated system is claimed in my patent Reissue No. 14,983 dated November 16, 1920. In order to coordinate the elements of the optical system, especially where the objective lens is in the path of the main beam in contradistinction to a separate objective in the path of each divided beam, it is highly desirable that the part of every path from lens to image which lies in glass be made equal; that is, that each part of the beam, after division, traverse the same distance in glass. This is an important feature of all the above arrangements.

It is of great importance that the geometrically identical images before referred to should be taken on the same film and not very distant from each other. There are several reasons for this. In the first place, any film during the mechanical and chemical processes of developing and fixing, undergoes a certain amount of change in form, principally shrinkage, and in general it cannot be assumed that two separate films will shrink to the same degree. Therefore, if the images were taken on two or more different films, they could not be relied upon to remain accurately the same in size through the process of development, printing and projecting upon the screen.

In the second place, the accurate superposition of two or more pictures on the projecting screen depends on the two or more images on the film used in projection, being otherwise positioned to extreme accuracy or out of position by the same small amount. Actual practice proves that lack of register on the screen is more annoying than an irregular displacement of the picture as a whole, that is, of all of the two or more superimposed images to the same degree. It is therefore important that the relative position on the screen of the two or more geometrically identical images should be more accurately constant than the mere positioning of non-attached films by the mechanism of the projector can accomplish. When the two or more images are on the same film and the film is treated uniformly throughout its length, pictures on the projecting screen once in register will remain accurately in register, since the slight irregularities of the mechanism when the pictures are similarly printed involves similar displacements for all of the superimposed screen images.

A characteristic of the present invention, at least in its preferred forms herein disclosed, is that the component beams are first deflected to one side of the path of the main beam and are subsequently reflected in the reverse sense. For example in Fig. 2 the component beams are first deflected to the left at $x$, $y$ and $z$, and subsequently are deflected to the right at $x'$, $y'$ and $z'$. Likewise in Fig. 5 the component beams 2 and 3 are first deflected to the left and then to the right.

Another characteristic contributing to the value of the invention in certain of its aspects is that the divided beams are reflected at oblique angles instead of right angles, some of the angles being acute and other obtuse. When using prisms one advantage of this feature is that the surface through which the beam enters the prisms may be employed subsequently to reflect one of the divided beams, as shown for example in Figs. 1 and 5. Another advantage is that the paths of the divided beams are thereby shortened.

I claim:

1. In a photographic apparatus, a plural image forming optical train, embodying a single objective for the incident rays, and a reflecting prism unit having a single plane incident ray receiving face and proximate emergent ray faces in a single plane at an angle to the plane of the incident ray receiving face, other faces of the prisms forming a light dividing reflector in the path of the incident rays, a single total reflector in the path of the rays of one division and two reflectors in the path of the rays of another division, said reflectors being arranged at angles to bring the emergent rays of both divisions into parallelism to form two images in the same plane and in proximity to each other.

2. In a photographic apparatus, a plural image forming optical train embodying a single objective for the incident rays, a light dividing device for reflecting one division of the incident rays laterally, a reflector for directing another division of the incident rays laterally in the same direction as the first mentioned division, and a supplemental reflector in each division positioned to direct the rays to form proximate duplicate images in the same focal plane and at one side of the axis of the incident rays.

3. A photographic apparatus for producing from a single point of view two images separate from each other in the same plane, comprising an assembly of reflecting prisms having a plane incident beam receiving face and emergent beam faces substantially in a single plane at an angle to the plane of the incident beam receiving face, a light dividing reflector to divide the incident beam, certain surfaces of the prisms being arranged in the paths of the divided beams at oblique angles to the incident beam to form images separate one from the other along the focal plane, the number of reflections and length of path of each divided beam being equal to that of the other.

4. A photographic apparatus for producing from a single point of view two proximate images separate from each other in the same plane comprising a reflecting prism assembly having a plane incident beam receiving face and emergent beam faces substantially in a single plane at an angle to the plane of the incident beam receiving face, a light dividing reflector inclined to reflect one division of the beam laterally, the assembly having a total reflecting prism surface arranged to reflect another division laterally in the same general direction as the first division, and the assembly having other total reflecting prism surfaces arranged to reflect the two divisions in parallel lines through said emergent beam faces to form separate images in the same plane but in separate areas along the plane.

5. A photographic apparatus for producing from a single point of view two images separate from each other in the same plane comprising a reflecting prism assembly having a plane incident beam receiving face and emergent beam faces substantially in a single plane at an angle to the plane of the incident beam receiving face, a light dividing reflector inclined to reflect one division of the beam laterally, the assembly having a total reflecting prism surface arranged to reflect another division laterally in the same general direction as the first division, and the assembly having other total reflecting prism surfaces arranged to reflect the two divisions in parallel lines through said emergent beam faces to form separate images in the same plane but in separate areas along the plane, the paths of the beams being substantially equal in length.

6. A photographic apparatus for producing from a single point of view two proximate images separate from each other in the same plane comprising a reflecting prism assembly having a plane incident beam receiving face and emergent beam faces in a single plane at an angle to the plane of the incident beam receiving face, a light dividing reflector between certain prisms of the assembly, said reflector being inclined to reflect one division of the beam laterally, the assembly having a total reflecting prism surface arranged to reflect another division laterally in the same general direction as the first division, and the assembly having other total reflecting prism surfaces arranged to reflect the two divisions in parallel lines through said emergent beam faces to form separate images in the same plane but in separate areas along the plane, the paths of the beams being substantially equal in length and at least part of the reflectors being inclined to reflect the respective beams at oblique angles.

7. A photographic apparatus for producing from a single point of view two images separate from each other in the same plane comprising an assembly of reflecting prisms having a plane incident beam receiving face and emergent beam faces in a single plane at an angle to the plane of the incident beam receiving face, a light dividing reflector between juxtaposed prisms of the assembly, said reflector being inclined to reflect one division of the beam laterally, the assembly having a total reflecting prism surface arranged to reflect another division laterally in the same general direction as the first division, and the assembly having other total reflecting prism surfaces arranged to reflect the two divisions in parallel lines through said emergent beam faces to form separate images in the same plane but in separate areas along the plane, said light dividing reflector being inclined to reflect at an oblique angle.

8. A photographic apparatus for producing from a single point of view three images separate from each other in the same plane comprising an assembly of reflecting prisms having a plane incident beam receiving face and emergent beam faces in a single plane at an angle to the plane of the incident beam receiving face, light dividing reflectors at other surfaces of the prisms respectively, arranged to divide the incident beam, certain surfaces of the prisms being arranged in the paths of the divided beams to throw to the image plane three images separate from each other along the focal plane.

9. A photographic apparatus for producing from a single point of view three proximate images separate from each other in the same plane comprising an assembly of reflecting prisms having a plane incident beam receiving face and emergent beam faces in a single plane at an angle to the plane of the incident beam receiving face, light dividing reflectors at other surfaces of the prisms respectively, arranged to divide the incident beam, certain surfaces of the prisms being arranged in the paths of the divided beams to throw to the image plane, along paths equal in length, three images separate from each other along the focal plane.

10. A system for simultaneously producing a plurality of images of an object field, comprising a light-dividing surface for dividing a beam of light into a plurality of component beams and a reflecting surface disposed in advance of said surface in the path of said first beam, said reflecting surface extending transversely across said path and obliquely across the path of one of the component beams, and another reflecting surface substantially parallel to said first reflecting surface for reflecting another of the component beams.

11. A system for simultaneously producing a plurality of images of an object field comprising a set of prisms having reflecting surfaces and a light-dividing means for dividing a beam into a plurality of similar beams, two of the prisms being constructed and arranged to permit light to enter through their reflecting surfaces, then to reflect the light internally, and subsequently again to reflect the light at their reflecting surfaces.

12. A system for simultaneously producing a plurality of images of an object field by dividing a main beam into a plurality of divided beams comprising a prism having a reflecting surface extending transversely across the path of the main beam at such angle as to permit the beam to enter with little reflection, a light-dividing device arranged at another surface of said prism in the path of said beam to reflect a part of the beam and to transmit a part of the beam, said device being angularly arranged so that said reflected part is reflected back to said surface at such angle as to be totally reflected, another prism having a reflecting surface extending transversely across the path of said transmitted part of the main beam at such angles as to permit said transmitted part to enter with little reflection, the second prism having a total reflecting surface in the path of said transmitted part arranged totally to reflect said part back to said first surface of the second prism at such angle that the part is again totally reflected.

13. A photographic apparatus for producing from a single point of view two proximate images separate from each other in the same plane comprising a reflecting prism unit having a plane incident beam receiving face and emergent beam faces in a single plane at an angle to the plane of the incident beam receiving face, a light dividing reflector at another surface of the unit inclined to reflect one division of the beam laterally, the unit having a refecting surface arranged to reflect another division laterally in the same general direction as the first division, and the unit having total reflecting surfaces arranged to reflect the two divisions in parallel lines through said emergent beam faces to form separate images in the same plane but in separate areas along the plane.

14. A photographic apparatus for producing from a single point of view two images separate from each other in the same plane comprising a reflecting prism unit having a plane incident beam receiving face and emergent beam faces in a single plane at an angle to the plane of the incident beam receiving face, a light dividing reflector at another surface of the unit inclined to refect one division of the beam laterally, the unit having a reflecting surface arranged to reflect another division laterally in the same general direction as the first division, and the unit having total reflecting surfaces arranged to reflect the two divisions in parallel lines through said emergent beam faces to form separate images in the same plane but in separate areas along the plane, the paths of the beams being substantially equal in length.

15. A photographic apparatus for producing from a single point of view two proximate images separate from each other in the same plane comprising a reflecting prism unit having a plane incident beam receiving face and emergent beam faces in a single plane at an angle to the plane of the incident beam receiving face, a light dividing reflector at another surface of the unit inclined to reflect one division of the beam laterally, the unit having a reflecting surface arranged to reflect another division laterally in the same general direction as the first division, and the unit having total reflecting surfaces arranged to reflect the two divisions in parallel lines through said emergent beam faces to form separate images in the same plane but in separate areas along the plane, the paths of the beams being substantially equal in length and at least part of the reflectors being inclined to reflect the respective beams at oblique angles.

16. A photographic apparatus for producing from a single point of view two images separate from each other in the same plane comprising a reflecting prism unit having a plane incident beam receiving face and emergent beam faces in a single plane at an angle to the plane of the incident beam receiving face. a light dividing reflector at another surface of the unit inclined to reflect one division of the beam laterally, the unit having a reflecting surface arranged to reflect another division laterally in the same general direction as the first division, and the unit having total reflecting surfaces arranged to reflect the two divisions in parallel lines through said emergent beam faces to form separate images in the same plane but in separate areas along the plane, said light dividing reflector being inclined to reflect at an oblique angle.

17. In a photographic apparatus, a plural image forming optical train embodying a single objective for the incident rays, light dividers for dividing the main beam into at least three similar component beams, and reflectors for directing the component beams along equal paths to separate image spaces in the same plane.

18. In a photographic apparatus, a plural image forming optical train embodying a single objective for the incident rays, light dividers for dividing the main beam into at least three similar component beams, and prismatic reflectors for directing the component beams along equal paths to separate image spaces in the same plane.

19. In a photographic apparatus. a plural image forming optical train embodying a single objective for the incident rays, light dividers for dividing the main beam into at least three similar component beams, and reflectors angularly disposed in the paths of the component beams, said dividers and reflectors being coordinated to direct the component beams along paths portions of which are parallel to each other and other portions of which are parallel to each other but non-parallel to the first portions.

20. A photographic apparatus for producing from a single point of view two images separate from each other in the same plane, comprising an assembly of reflecting prisms having a plane incident beam receiving face and emergent beam faces substantially in a single plane at an angle to the plane of the incident beam receiving face, a light dividing reflector to divide the incident beam, certain surfaces of the prisms being arranged in the paths of the divided beams at oblique angles to the incident beam to form images separate one from the other along the focal plane, the number of reflections and length of path of each divided beam being equal to that of the other, said prisms forming substantially continuous paths for said beam from said beam receiving face to said emergent beam faces respectively.

21. A photographic apparatus for producing from a single point of view two proximate images separate from each other in the same plane comprising a reflecting prism assembly having a plane incident beam receiving face and emergent beam faces, substantially in a single plane at an angle to the plane of the incident beam receiving face, a light dividing reflector inclined to reflect one division of the beam laterally, the assembly having a total reflecting prism surface arranged to reflect another division laterally in the same general direction as the first division, and the assembly having other total reflecting prism surfaces arranged to reflect the two divisions in parallel lines through said emergent beam faces to form separate images in the same plane but in separate areas along the plane, the prism material substantially filling the space between said beam receiving face and said emergent beam face along the path of each beam.

22. A photographic apparatus for producing from a single point of view two images separate from each other in the same plane comprising a reflecting prism assembly having a plane incident beam receiving face and emergent beam faces substantially in a single plane at an angle to the plane of the incident beam receiving face, a light dividing reflector inclined to reflect one division of the beam laterally, the assembly having a total reflecting prism surface arranged to reflect another division laterally in the same general direction as the first division, and the assembly having other total reflecting prism surfaces arranged to reflect the two divisions in parallel lines through said emergent beam faces to form separate images in the same plane but in separate areas along the plane, the paths of the beams being substantially equal in length and being substantially wholly in prism material between said beam receiving face and said emergent beam faces.

23. A photographic apparatus for producing from a single point of view two proximate images separate from each other in the same plane comprising a reflecting prism assembly having a plane incident beam receiving face and emergent beam faces in a single plane at an angle to the plane of the incident beam receiving face, a light dividing reflector between certain prisms of the assembly, said reflector being inclined to reflect one division of the beam laterally, the assembly having a total reflecting prism surface arranged to reflect another division laterally in the same general direction as the first division, and the assembly having other total reflecting prism surfaces arranged to reflect the two divisions in parallel lines through said emergent beam faces to form separate images in the same plane but in separate areas along the plane, the paths of the beams being substantially equal in length, and being substantially wholly in prism material between said beam receiving face and said emergent beam faces, and at least part of the reflectors being inclined to reflect the respective beams at oblique angles.

24. A photographic apparatus for producing from a single point of view two images separate from each other in the same plane comprising an assembly of reflecting prisms having a plane incident beam receiving face and emergent beam faces in a single plane at an angle to the plane of the incident beam receiving face, a light dividing reflector between juxtaposed prisms of the assembly, said reflector being inclined to reflect one division of the beam laterally, the assembly having a total reflecting prism surface arranged to reflect another division laterally in the same general direction as the first division, and the assembly having other total reflecting prism surfaces arranged to reflect the two divisions in parallel lines through said emergent beam faces to form separate images in the same plane but in separate areas along the plane, said light dividing reflector being inclined to reflect at an oblique angle, said prisms forming substantially continuous paths for said beam from said beam receiving face to said emergent beam faces respectively.

25. A photographic apparatus for producing from a single point of view three images separate from each other in the same plane comprising an assembly of reflecting prisms having a plane incident beam receiving face and emergent beam faces in a single plane at an angle to the plane of the incident beam receiving face, light dividing reflectors at other surfaces of the prisms respectively, arranged to divide the incident beams, certain surfaces of the prisms being arranged in the paths of the divided beams to throw to the image plane three images separate from each other along the focal plane, said prisms forming substantially continuous paths for said beam from said beam receiving face to said emergent beam faces respectively.

26. A photographic apparatus for producing from a single point of view three proximate images separate from each other in the same plane comprising an assembly of reflecting prisms having a plane incident beam receiving face and emergent beam faces in a single plane at an angle to the plane of the incident beam receiving face, light dividing reflectors at other surfaces of the prisms respectively, arranged to divide the incident beam, certain surfaces of the prisms extending obliquely across the paths of the divided beams to throw to the image plane three images separate from each other along the focal plane, the paths of the divided beams being equal in length and substantially wholly in prism material.

Signed by me at Boston, Massachusetts, this fourth day of October 1920.

DANIEL F. COMSTOCK.